Figure 1:
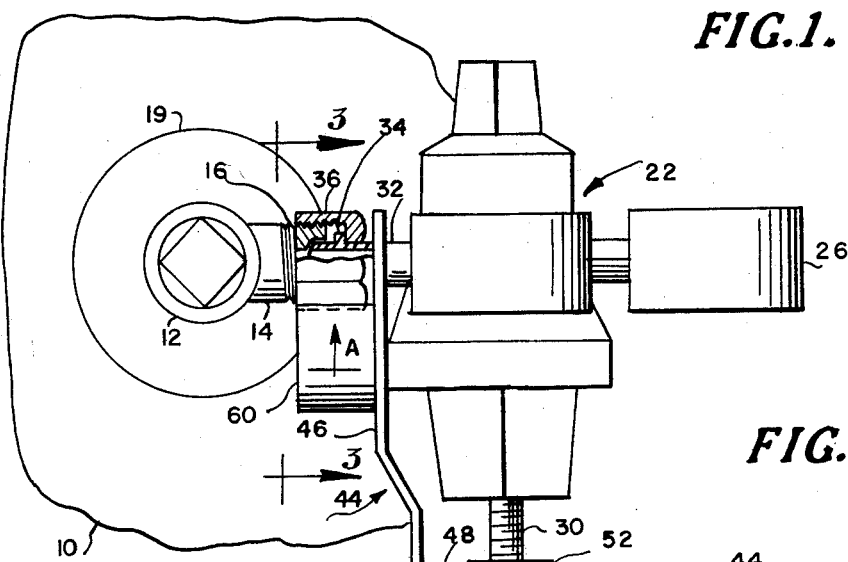

March 17, 1964 L. C. HALSTEAD 3,125,322
SAFETY DEVICE FOR PRESSURE REGULATORS OF THE
LIKE USED WITH FLUID PRESSURE TANKS
Filed Sept. 28, 1960

INVENTOR

LESTER C. HALSTEAD

BY *Cushman, Darby + Cushman*
ATTORNEYS

United States Patent Office 3,125,322
Patented Mar. 17, 1964

1

3,125,322
SAFETY DEVICE FOR PRESSURE REGULATORS OF THE LIKE USED WITH FLUID PRESSURE TANKS
Lester C. Halstead, 415 Bailey Ave., Beckley, W. Va.
Filed Sept. 28, 1960, Ser. No. 59,016
1 Claim. (Cl. 251—149.9)

The present invention relates to a safety device for use with pressure regulators or the like in the attachment and removal of the pressure regulators from fluid pressure tanks. More particularly the present invention relates to an attachment for a pressure regulator used with high pressure fluid tanks, the attachment being such that it prevents the regulator from being removed from the tank until the pressure regulator has been adjusted to a predetermined position.

High pressure tanks for the storage of liquid, gases, or vapors, are normally provided with a fitting at the end having a valve therein and an outlet therefrom through which the contents of the tank or container may be dispensed. In the dispensing of such fluids as liquid oxygen, acetylene or the like, a pressure regulator must be attached to the outlet fitting so that when the valve in the outlet fitting is opened, the pressure of fluid being dispensed may be adjusted to a desired pressure at the point of use. Since the fluids stored in the tanks are at an initial pressure, much higher than the pressure used in dispensing the fluids, it is necessary that the pressure regulator be gradually opened to give a desired pressure at the point of use. As the pressure decreases in the tank, the pressure regulator is opened further until such time that all of the fluid is dispensed from the tank.

When the high pressure tank is empty, the pressure regulator assembly is normally removed from the tank and installed on a full tank. Care must be taken to insure the control valve of the pressure regulator being in a closed position when installed on a new tank because when the valve in the outlet fitting of the high pressure storage tank is opened, the full pressure of the tank is applied to the regulator. In other words, an operator after removing the pressure regulator assembly from an empty tank must adjust the valve in the pressure regulator to make sure it is closed before he installs the pressure regulator on a full tank.

Accidents have occurred when inexperienced personnel have installed pressure regulators on high pressure tanks with the pressure regulator valve in the open position. If a pressure regulator is installed on a tank with its control valve open, and then the valve on the tank outlet fitting is opened, the full pressure of the tank oftentimes causes explosion as the dispensing means such as an acetylene torch or the like cannot withstand the full pressure from the tank. Such explosions have resulted in the serious loss of life and property.

An object of the present invention is to provide a safety device or attachment for use with conventional type of pressure regulators and fluid pressure tanks which insures the pressure regulator having its valve adjusted to the proper position when the pressure regulator is removed from an empty tank and installed on a full tank.

Another object of the present invention is to provide a safety device for use with pressure regulators and fluid pressure tanks, the device operating in such a manner that when the fluid pressure regulator is assembled onto a full tank, such pressure regulator cannot be removed from the tank unless the valve of the pressure regulator is in a closed position.

Still another object of the present invention is to provide a safety device for use on a pressure regulator assembly, the device insuring that the control valve of the regulator assembly is in the closed position before the regulator assembly can be attached to a high pressure tank or the like.

A further object of the present invention is to provide a safety attachment which may be installed on existing commercial pressure regulators without substantial modification of the regulators, the safety device insuring the valve of the regulator being in a closed position before the regulator can be coupled to a high pressure fluid storage tank.

Ancillary to the preceding object it is a further object of the present invention to provide a safety attachment or device which may be inexpensively manufactured and easily assembled for use on existing commercial pressure regulators.

Figure 4:
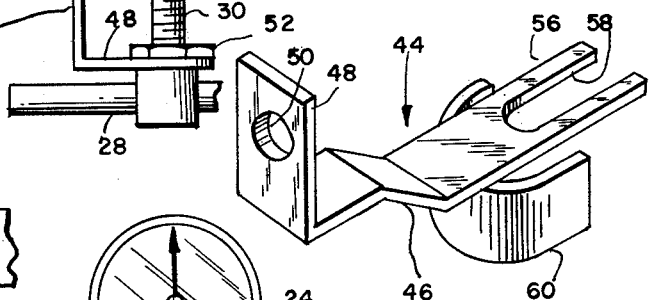
Figure 3:
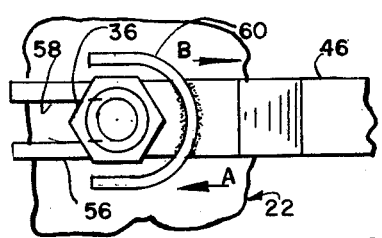
Figure 2:
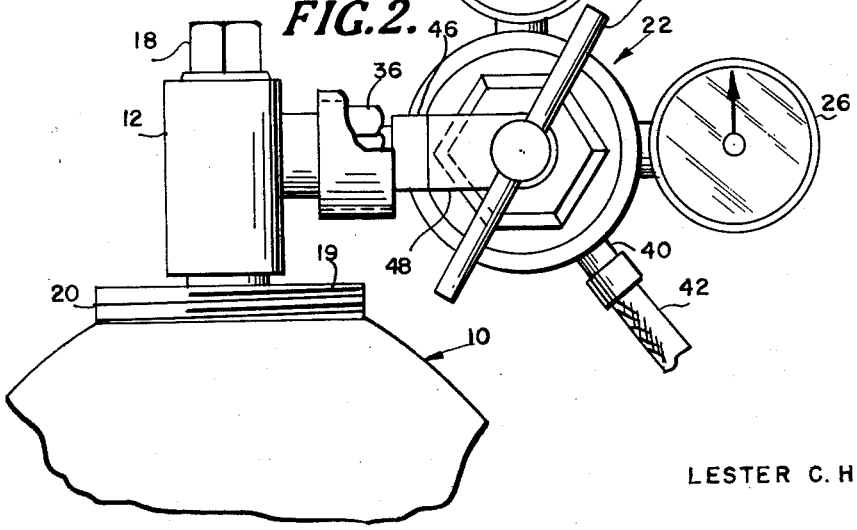

These and other objects of the present invention will appear more fully in the following specification, claims and drawings in which:

FIGURE 1 is a fragmentary top plan view partly broken away of a fluid pressure tank having a pressure regulator assembly installed thereon and illustrating the safety device or attachment of the present invention in a position where the regulator assembly may be uncoupled from the tank, FIGURE 2 is a side elevational view partly broken away showing a commercial pressure regulator attached to a fluid pressure tank with the safety device or attachment of the present invention enclosing the coupling means, FIGURE 3 is a fragmentary view taken substantially on the line 3—3 of FIGURE 1, the tank being omitted, and showing the safety device or attachment of the present invention moved to a position where the pressure regulator cannot be installed onto a tank or cannot be removed from a tank until its control valve is closed, FIGURE 4 is a perspective view of the safety device of the present invention which is adapted for use with commercial types of pressure regulators.

Referring now to the drawings wherein like characters and reference numerals represent like and similar parts, a high pressure tank for the storage of fluids is designated generally by the numeral 10. For the purpose of description, this tank may be what is known as a commercial oxygen storage cylinder or the like. Generally such a cylinder 10 is provided at its upper end with an outlet fitting 12 having a laterally offset outlet 14 externally threaded as indicated at 16. Hhe fitting 12 is provided with an on-off valve (not shown) which may be operated by a wrench fitting over the external portion 18 of the valve operating arm. In some modifications of the outlet fitting 12, self opening valves are provided, such valves being opened upon coupling of a pressure regulator thereto. Tank 10 is provided with a collar 19 having external threads 20 for receiving a protective cap or cover (not shown), the cap or cover being provided on the tank when the tank is being transported to the site of use.

A pressure regulator assembly, generally designated by the numeral 22 is shown coupled to the outlet 14 fitting 12 in FIGURES 1 and 2. The pressure regulator assembly 22 may be provided with a high pressure gage 24 and a low pressure gage 26. The body of the regulator assembly 22 contains the usual diaphragm valve (not shown) operable by a handle 28 carried on the end of a threaded valve operating member or stem 30. A fitting 32 on the pressure regulator assembly 22 is provided with a nozzle having a collar 34 thereon. The usual ring nut 36 is carried on the fitting 32 and abuts the collar 34 as shown in FIGURE 1. The nut 36 is threaded onto the external threads 16 of outlet 14 to assemble the pressure regulator assembly 22 on the tank 10.

As best shown in FIGURE 2, pressure regulator assembly 22 is provided with an outlet 40 on which a hose or tube 42 is fixedly connected. Hose or tube 42 extends to the point of use such as to an acetylene torch or the like (not shown).

In the assembly of the conventional pressure regulator assembly 22 onto the conventional oxygen cylinder 10 the handle 28 which operates the control valve of the regulator assembly 22 is so rotated as to move the valve operating member 30 to a position to close the control valve within the pressure regulator assembly. Once the regulator has been coupled to the tank 10, as shown in FIGURES 1 and 2, the system is ready for operation. The valve within the outlet fitting 12 is opened by turning the nut 18. Then the handle 28 of pressure regulator 22 is rotated to a position where a desired pressure of fluid may be metered through the outlet hose 42 to the point of use. As the pressure decreases within the tank or cylinder 10, the handle 28 is rotated so as to open the pressure regulator control valve to compensate for the drop of pressure within the tank. When the cylinder 10 is completely empty, the pressure regulator 22 is removed from cylinder 10 and installed on a full cylinder. However, before installation of the pressure regulator 22 on a full cylinder 10, it is extremely important to be sure the control valve within the pressure regulator is closed so as to eliminate the danger of explosion.

As best shown in FIGURES 1 to 4, the present invention contemplates the provision of a safety device or attachment generally designated by the numeral 44 for use in assembly and removal of the pressure regulator 22 on the cylinder 10. In more detail, the safety device 44 includes an elongated member 46 having an end portion 48 offset therefrom at approximately 90°. The end portion 48 is provided with an aperture 50 therethrough and as shown in FIGURE 1, the valve operating member 30 is adapted to fit through the aperture 50 with the end portion 48 abutting the hub of handle 28. A nut 52 threaded onto the valve operating member 30, wedges the end portion 48 of the member 46 against the hub of the handle 28 so that the inward and outward movement of the valve operating member 30 also causes movement of the elongated member 46. The nut 52 is not tight enough to prevent relative rotational movement of member 46 and handle 28.

The free end 56 of the elongated member 46 is bifurcated by providing an open ended elongated slot 58 therein as best shown in FIGURES 3 and 4. The bifurcated end 56 defined by the slot 58 receives the fitting 32 so that the movement of the elongated member 46 is controlled.

Welded to the underneath surface of the elongated member 46, as shown in FIGURE 4, is a U-shaped guard member 60. The member 60 opens in the same direction as the slot 58 and has a width slightly greater than the major diameter of the ring nut 36. U-shaped member 60 carried by the elongated member 46 encompasses the ring nut 36 when the control valve within the pressure regulator 22 is opened by turning in the valve operating member 30. As shown in FIGURE 1, the ring nut 36 has been threaded onto the threads 16 of outlet 14. The U-shaped guard member 60 has not encompassed the nut 36 as the control valve within the pressure regulator 22 is not open. However, when the handle 28 is turned to open the diaphragm control valve within the regulator 22, the U-shaped member 60 moves in the direction of the arrow A.

Referring now to FIGURE 3, it will be noted that the U-shaped member 60 completely encompasses the ring nut 36. When in this position, the control valve within the pressure regulator 22 is open so that fluid may be dispensed through the hose 42 at a desired pressure. The operator cannot remove the pressure regulator 22 from the outlet 14 as a wrench cannot be placed on the ring nut 36. When the fluid within the cylinder 10 is exhausted, and the operator wants to remove the regulator 22 from the tank 10, the operator must back off the handle 28 so that the valve operating member 30 closes the control valve within the regulator 22. As the handle 28 is backed off, the movement of the valve operating member 30 also causes movement of the elongated member 46 in a direction as indicated by the arrow B in FIGURE 3 and, thus, the U-shaped guard or collar member 60 is moved to a position where the ring nut 36 is exposed. When the guard 60 has moved to a position exposing the ring nut 36, the valve within the pressure regulator 22 is closed and thus it is safe to install the pressure regulator on a full tank 10. Also, it is now evident that installation of the pressure regulator on a full cylinder or tank 10 is impossible unless the valve within the regulator 22 is closed as the U-shaped guard member 60 encompasses the nut 36 whenever the valve within the regulator 22 is open and consequently no wrench can be applied to the ring nut 36.

It will be understood, that various modifications may be made to the specific attachment disclosed herein without departing from the spirit of the invention or the scope of the claim. Therefore, the terminology used in the specification is for the purpose of description and not limitation, the scope of the invention being defined in the claim.

I claim:

In combination: a fluid pressure tank having a threaded outlet thereon, a fluid pressure regulator having control means thereon for dispensing fluid from said tank, said control means including a threaded valve operating member having a handle thereon, said fluid pressure regulator also having a fitting thereon for coupling to said outlet, said fitting including a ring nut for threadily engaging the threads of said outlet, an elongated member having an offset portion with an aperture therein through which said valve operating member extends, means securing said elongated member to said valve operating member for movement therewith, said elongated member having a free end provided with an open-ended slot adapted to receive said fitting on said pressure regulator and provide a guide for said elongated member when the same is moved by said valve operating member, a U-shaped guard member adjacent said free end for enclosing said ring nut when said valve operating member is moved to a position opening said pressure regulator whereby said pressure regulator is prevented from being uncoupled from said outlet, said U-shaped guard member being moved to a position to expose said ring nut when said valve operating member is moved to a position closing said fluid pressure regulator.

References Cited in the file of this patent

UNITED STATES PATENTS

| | | |
|---|---|---|
| 1,236,077 | Gardner | Aug. 7, 1917 |
| 1,254,460 | Zobell | Jan. 22, 1918 |
| 1,567,030 | Bryant | Dec. 29, 1925 |
| 2,165,699 | Fisher | July 11, 1939 |
| 2,327,654 | McIntosh | Aug. 24, 1943 |
| 2,733,937 | Mowrer | Feb. 7, 1956 |

FOREIGN PATENTS

| | | |
|---|---|---|
| 43,223 | Switzerland | Apr. 23, 1908 |
| 278,033 | Great Britain | Sept. 19, 1927 |